(12) United States Patent
Ulrich et al.

(10) Patent No.: US 6,443,470 B1
(45) Date of Patent: Sep. 3, 2002

(54) FOLDING SCOOTER

(75) Inventors: Nathan T. Ulrich, Lee, NH (US); Karl T. Ulrich, Narberth, PA (US); Jeffrey A. Salazar, Belmont, CA (US); Michael L. Simmons, Cambridge, MA (US)

(73) Assignee: Nova Cruz Products, Inc., Wilmington, DE (US)

( * ) Notice: Subject to any disclaimer, the term of this patent is extended or adjusted under 35 U.S.C. 154(b) by 0 days.

(21) Appl. No.: 09/634,085

(22) Filed: Aug. 8, 2000

Related U.S. Application Data

(60) Provisional application No. 60/148,792, filed on Aug. 13, 1999.

(51) Int. Cl.[7] .............................................. B62M 1/00
(52) U.S. Cl. ................................ 280/87.041; 280/87.05
(58) Field of Search ..................... 280/87.01, 87.021, 280/87.041, 87.05, 775

(56) References Cited

U.S. PATENT DOCUMENTS

| | | | | |
|---|---|---|---|---|
| 1,227,888 A | * | 5/1917 | Converse | 280/87.041 |
| 1,531,710 A | * | 3/1925 | McLaren | 280/87.041 |
| 4,203,610 A | | 5/1980 | Mihalik | 280/87.04 |
| 4,445,699 A | | 5/1984 | Darasko | 280/87.04 |
| 4,799,701 A | | 1/1989 | Lindau et al. | 280/87.041 |
| 4,821,832 A | | 4/1989 | Patmont | 180/208 |
| 4,842,091 A | | 6/1989 | Badsey | 180/219 |
| 5,388,659 A | | 2/1995 | Pepe | 180/219 |
| 5,927,733 A | * | 7/1999 | Banda | 280/87.041 |
| 5,954,349 A | | 9/1999 | Rützel | 280/87.041 |
| 6,012,539 A | | 1/2000 | Patmont | 180/223 |
| 6,120,044 A | * | 9/2000 | Tsai | 280/87.05 |
| 6,135,059 A | | 10/2000 | Brock | 119/702 |
| 6,139,035 A | | 10/2000 | Tsai | 280/87.041 |

* cited by examiner

Primary Examiner—Brian L. Johnson
Assistant Examiner—Tony Winner
(74) Attorney, Agent, or Firm—Steven J. Weissburg

(57) ABSTRACT

A scooter has a plurality of wheels, a steerer, a platform, and a steerer support. The steerer support connects the steerer to the platform. The steerer support can rotate with respect to the platform, allowing the scooter to be folded when not in use. The steerer support can nest within the platform, further allowing the scooter to collapse into a compact position. The steering axis, front wheel diameter, and fork geometry are arranged to provide stable steering. Specifically, the steering axis and the front wheel axis of rotation are both located aft of the centerline of the steerer. Further, the contact point between the front wheel and the ground and the axis about which the front wheel rotates are located aft of the steering axis about which the steerer rotates. The trail, measured between the steering axis and the front wheel contact point, is kept relatively small, between 0 and 75 mm. Also disclosed is a collapsing steerer, a parallel-rail support structure, and a compact braking element.

8 Claims, 8 Drawing Sheets

FOLDING SCOOTER

This application claims benefit of provisional No. 60/148,792 filed Aug. 13, 1999.

BACKGROUND

This invention relates to personal transportation devices and more specifically to scooters.

Most people walk at speeds of 3–6 kilometers per hour, so that walking a distance of 1 kilometer requires 10–20 minutes. For centuries, people have sought to increase the speed and/or the ease with which they travel.

Early transportation schemes employed watercraft (e.g., canoes, rafts) or large animals (e.g., camels, elephants, horses). Wheeled devices provided improved performance because of the ability of wheels to reduce the friction and associated energy dissipation in moving across the ground. In the early 1800s, two-wheeled human-powered devices called Draisines were invented and produced. A person using one of these devices straddled a frame and employed running for propulsion. In the mid-1800s, pedals were attached to Draisines creating the Velocipede, the precursor to the modern bicycle. Subsequent inventions include scooters, roller skates, and skateboards. Today, the dominant human-powered personal transportation devices include bicycles, roller skates, and skateboards. Scooters are also widely available.

Despite advances over the past several centuries, these existing devices fail to provide humans with efficient, highly convenient, small, lightweight, and easily deployed means of traveling distances of 10 km or less. Bicycles require substantial storage area, can not be easily carried in automobiles or on public transportation, and can be stolen when parked outdoors. Roller skates require substantial time to put on and take off, and when not in use are awkward to carry. Skateboards are small and light, but require substantial athletic ability to ride and can be frightening and dangerous when cornering or descending hills. Scooters, whether human-powered or motor-powered, have historically not been light enough or small enough to conveniently carry.

It is an object of this invention to provide a means of efficient personal transportation that can be easily carried and stored when not in use, and that is easily used by people with a wide range of athletic abilities.

SUMMARY

A preferred embodiment of the invention is a scooter having a plurality of wheels, a steerer, a platform, and a steerer support. The steerer support connects the steerer to the platform. The steerer support can rotate with respect to the platform, allowing the scooter to be folded when not in use. The invention allows the steerer support to nest within the platform, further allowing the scooter to collapse into a compact position.

An aspect of the invention is also a configuration of the steering axis, front wheel diameter, and fork geometry that provides stable steering. Specifically, the contact point between the front wheel and the ground is located aft of the steering axis about which the steerer rotates. Furthermore, the trail, which is the distance along the ground, between the front wheel contact point and the steering axis is small, between approximately 0 and 75 mm. The front wheel axis and the steering axis are also aft of the centerline of the steerer.

Additional aspects of the invention include a collapsing steerer, a parallel-rail support structure, and a compact braking element.

BRIEF DESCRIPTION OF THE DRAWINGS

These and other features, aspects, and advantages of the present invention will become better understood with regard to the following description, appended claims and accompanying drawings, where:

DETAILED DESCRIPTION

Figure 1:
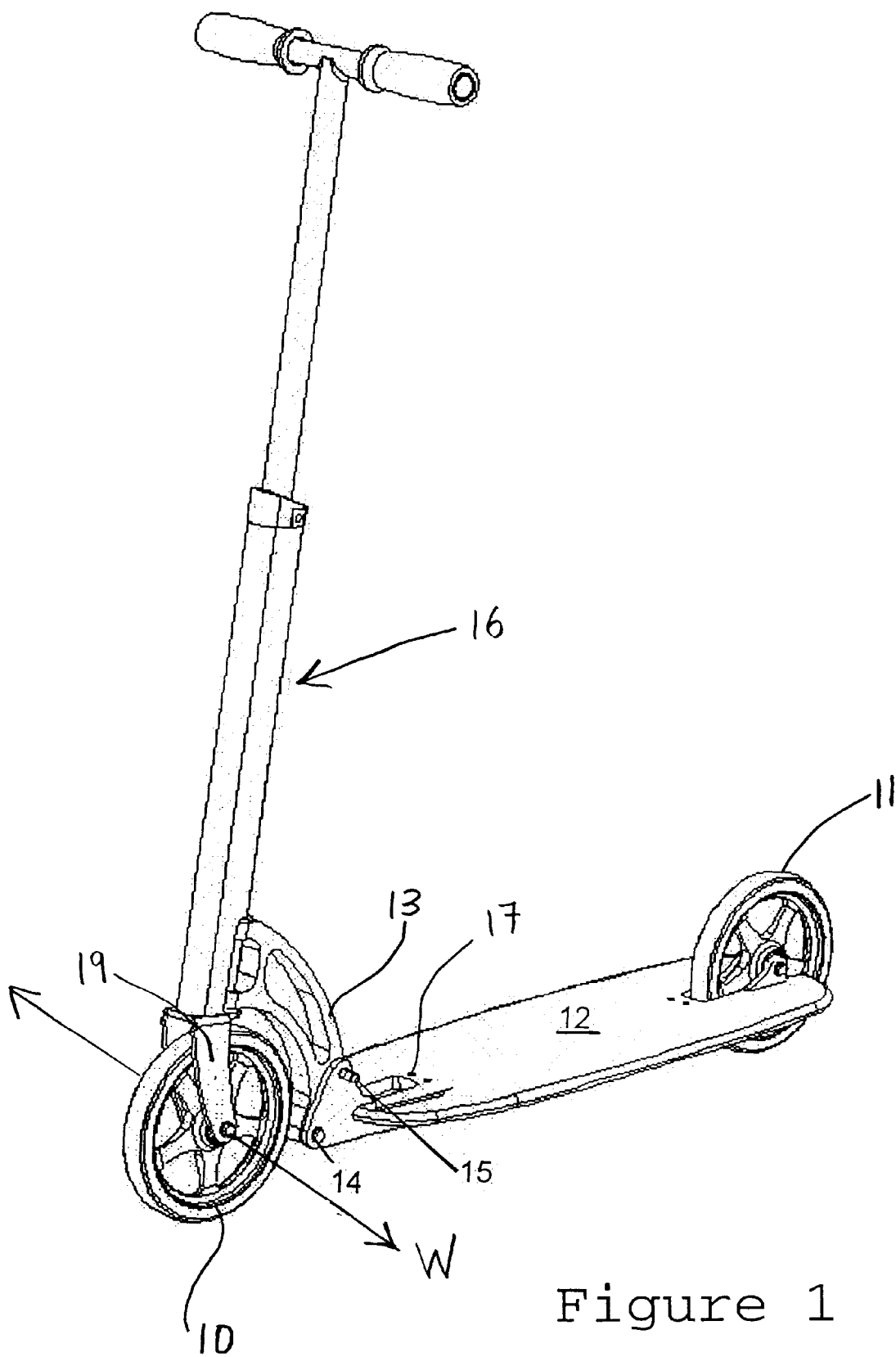
FIG. 1 is an overall perspective view of an embodiment of the invention shown in the deployed position.
Figure 2:
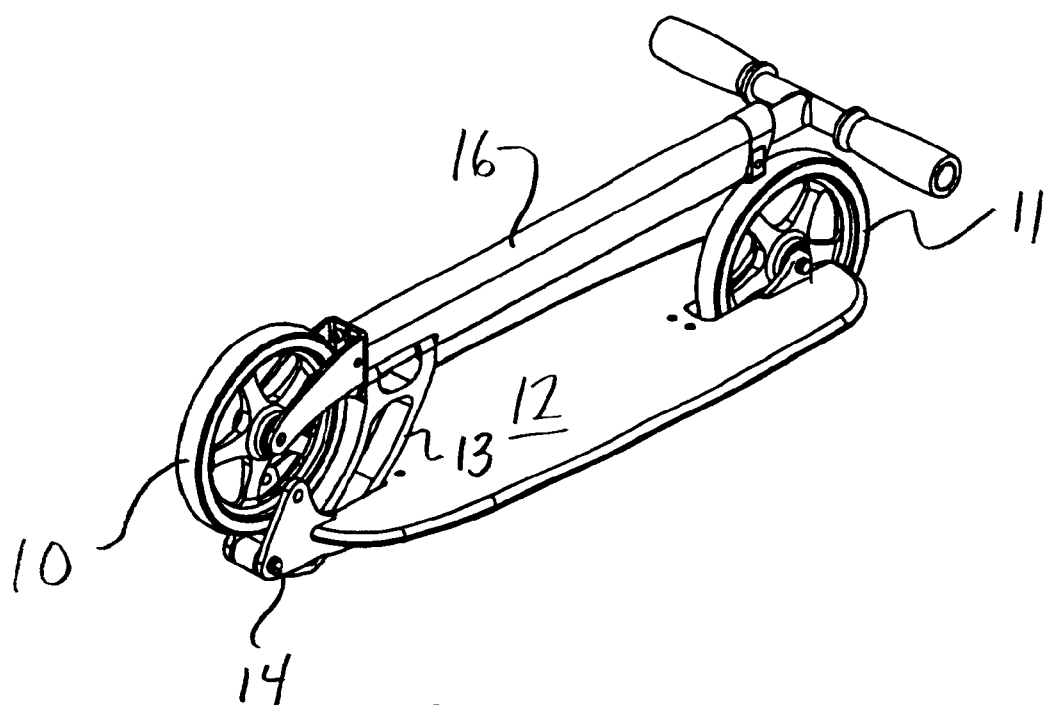
FIG. 2 is a perspective view of an embodiment of the invention shown in the folded position.

A preferred embodiment of the invention is shown in the deployed position in FIG. 1. This embodiment has a front wheel 10, rear wheel 11, deck 12, steerer support 13, pivot 14, locking pin 15, steerer 16 and fork 19. FIG. 2 shows this embodiment in the collapsed position. A platform has a deck 12 and two rails. These rails, left rail 30 and right rail 31 are shown in FIG. 3.

In a preferred embodiment of the invention, deck 12 is fastened to rails 30 and 31 with fasteners 17 and cleats 32. Fasteners 17 pull deck 12 against rails 30 and 31 via cleats 32.

The embodiment shown in FIGS. 1–8 is a push scooter in which power is supplied by the human user. However, in other embodiments of the invention, not shown, power can be applied to the rear wheel by an electric motor or internal combustion engine.

Figure 3:
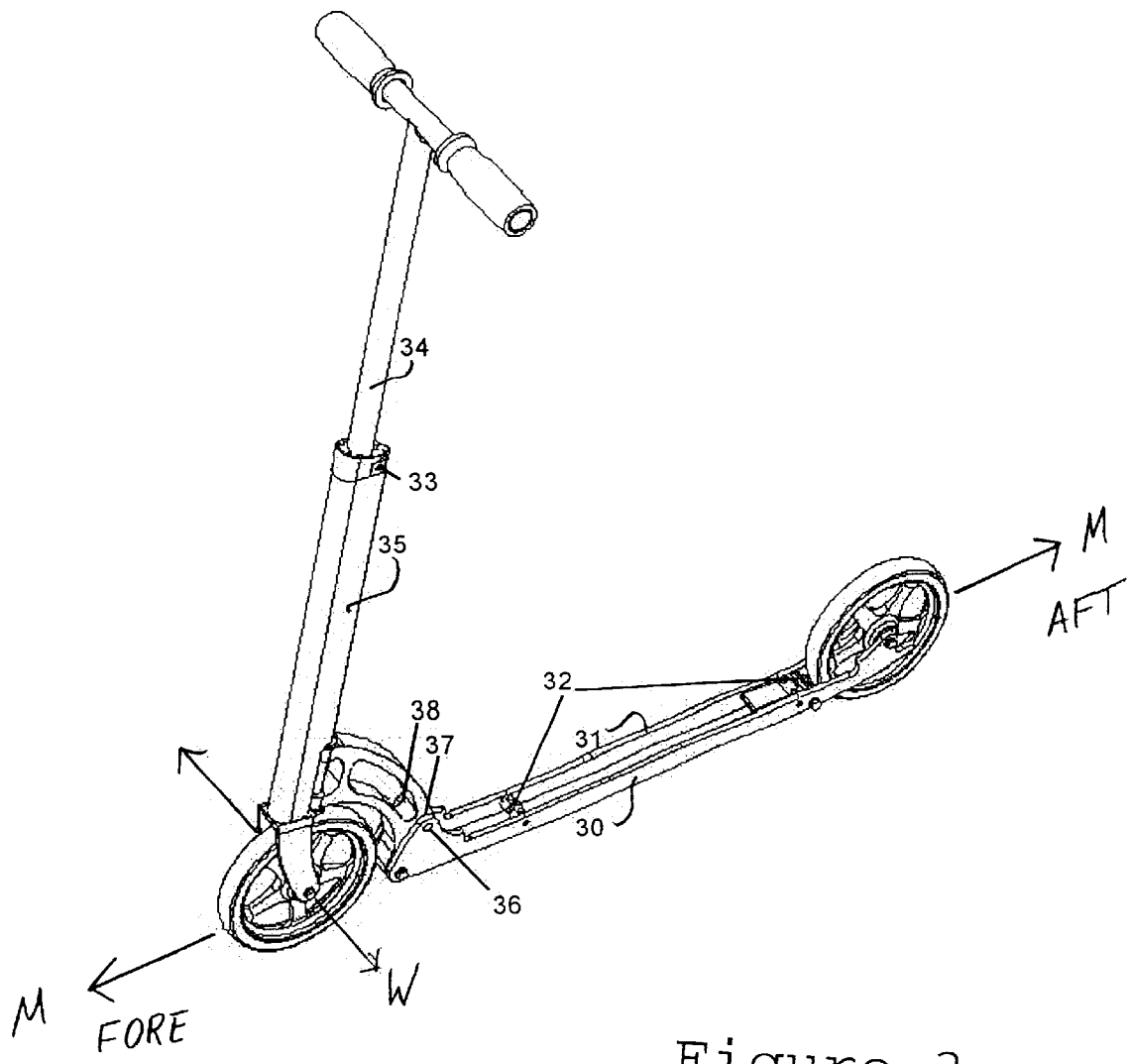
FIG. 3 is a perspective view of an embodiment of the invention shown without a deck, and in a deployed position.
Figure 4:
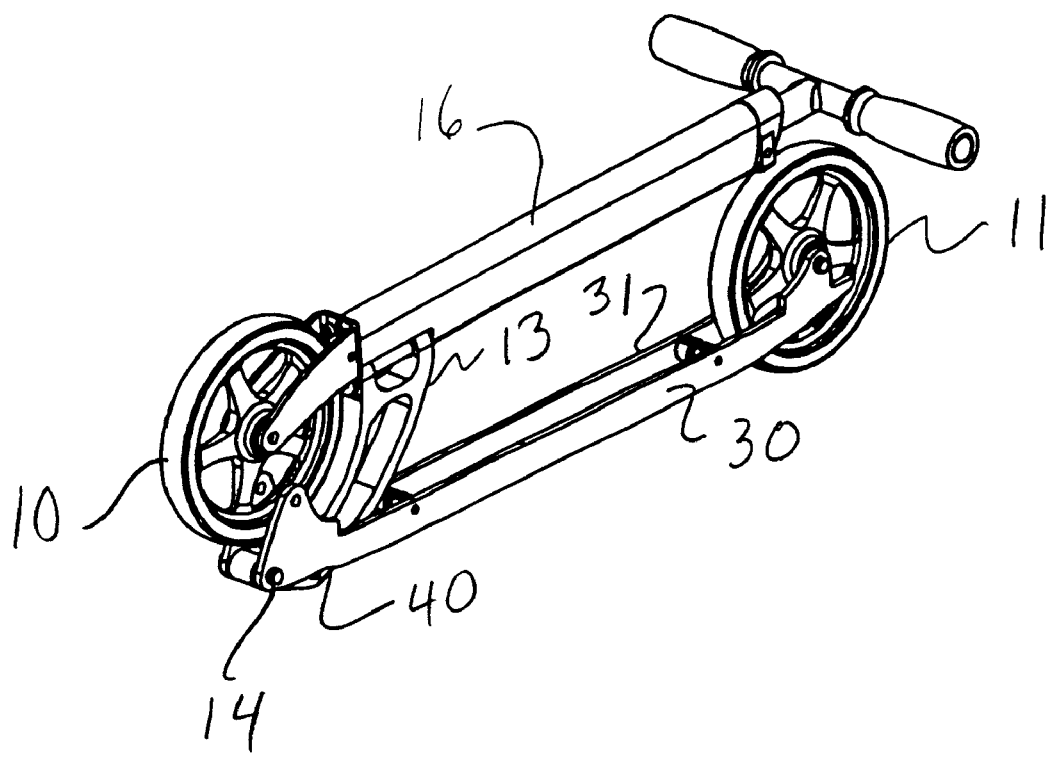
FIG. 4 is a perspective view of an embodiment of the invention shown without a deck, and in a folded position.

To collapse the scooter, the user loosens clamp 33 in FIG. 3 and telescopes handlebar 34 into lower steerer 35. Next, the user removes locking pin 15 from holes 36, 37, and 38 in FIG. 3. The user then folds steerer 16 towards the platform comprised of deck 12 and rails 30 and 31. Steerer support 13 rotates about pivot 14 and nests within the platform. Locking pin 15 is finally inserted back through hole 37 and steerer support 13 is prevented from rotating by the interference of locking pin 15 with rail notch 40 (FIG. 4) and another similar notch (not shown) on the other side of the scooter in the rail 31.

The location of pivot 14 and the geometry of the steerer support and platform contribute to determining how compactly the scooter can be collapsed. The present invention allows the steerer support and the platform to nest together, further allowing the angle between the steerer and platform to be minimized when the scooter is collapsed. Locating pivot 14 as close as possible relative to the ground, when the scooter's wheels are resting on the ground, in combination with the nesting of the steerer and the platform, allows the scooter to collapse within a small dimension perpendicular to the plane of the platform. However, the pivot 14 must be located at a sufficient height above the plane in which the wheels contact the ground to allow clearance for bumps and other obstacles. In a preferred embodiment of the invention, the pivot is located approximately 60 mm above the plane in which the wheels contact the ground.

Figure 5:
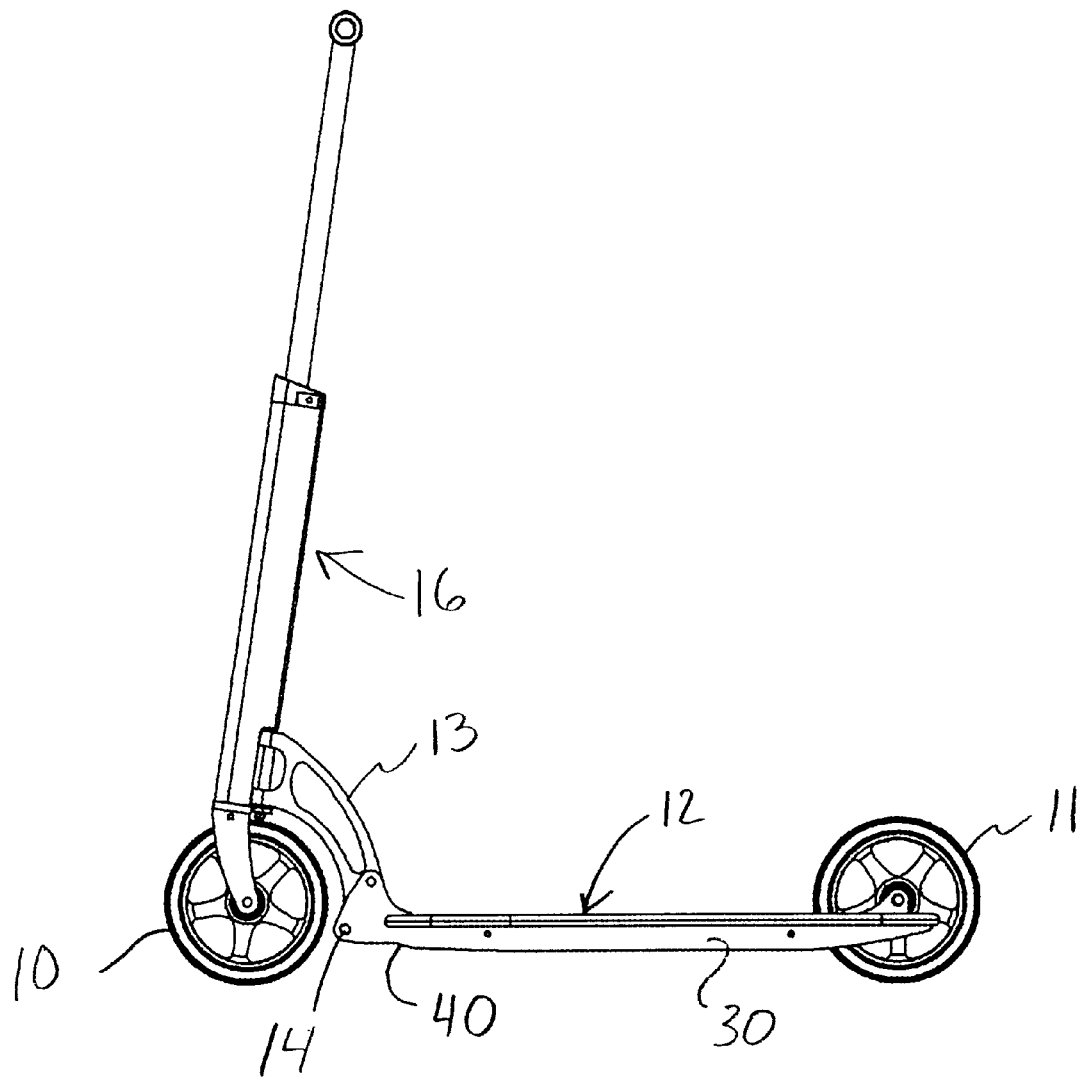
FIG. 5 is a side view of an embodiment of the invention in a deployed position.
Figure 6:
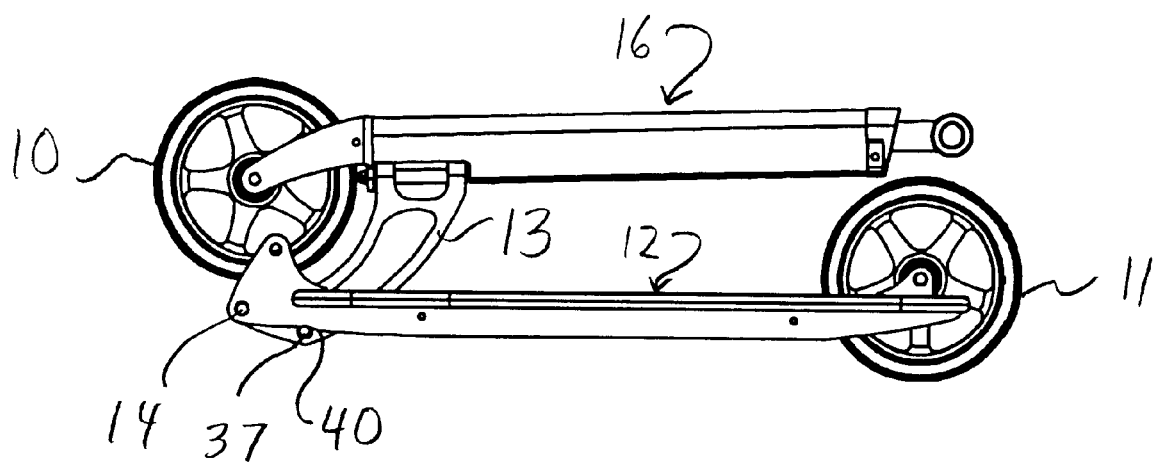
FIG. 6 is a side view of an embodiment of the invention in a folded position.

FIGS. 5 and 6 illustrate the deployed and collapsed positions of an embodiment of the invention shown from a side.

Figure 7:
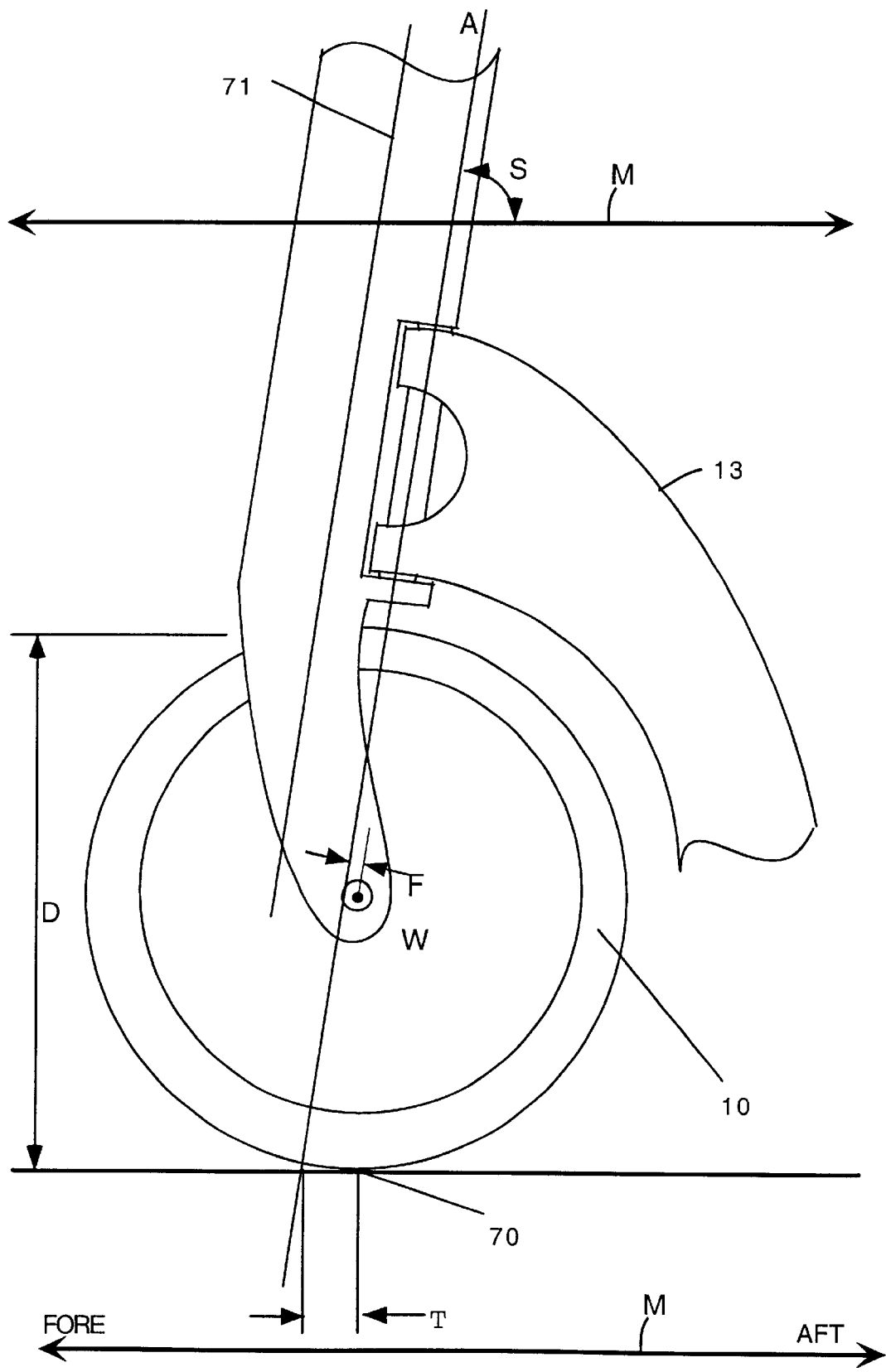
FIG. 7 is a side view of the front portion of an embodiment of the invention showing the steering geometry.

FIG. 7 illustrates the steering geometry of a preferred embodiment of the invention. Stable steering requires that the contact point 70 between front wheel 10 and the ground be located aft of the steering axis A about which the steerer rotates. Aft and fore are defined by a motion axis M along which the scooter moves in a straight ahead direction. The distance along a planar surface, such as the ground, between the contact point 70 of the front wheel upon the planar surface, and the intersection with the plane, of the steering axis A, is defined as the trail T. The size of the trail T is determined according to the basic rules of plane geometry by the steering angle S, the wheel diameter D, and the fork offset F. The steering angle S is measured between the steering axis A and the motion axis M. The fork offset F is the distance along the direction of motion between the steering axis A and the wheel axis W. As S increases, T decreases. As D increases, T increases. As F increases, T increases. In a preferred embodiment of the invention, D is approximately 180 mm, S is approximately 81 degrees, F is approximately 0 mm and the resulting T is approximately 13 mm. The desirable range for T is between 0 and 75 mm, with smaller values providing less stable, but more responsive steering. In a preferred embodiment of the invention, the wheel axis W and the steering axis A are both located aft of the centerline 71 of the steerer. The centerline 71 is substantially parallel to the major axis of the elongated steerer, and intersects a point in the cross section of the steerer that is located at the midpoints of the major and minor axes of the cross section. This arrangement allows for a desirable value of T, while allowing the front wheel to be located close to the platform and steerer support, providing a compact configuration.

Figure 8:
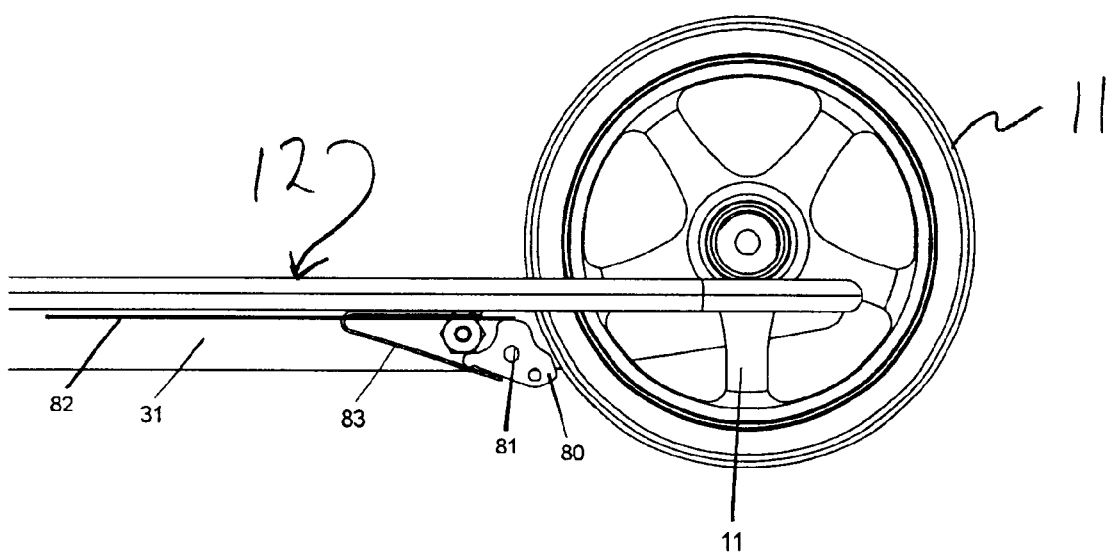
FIG. 8 is a cross-sectional view of a portion of an embodiment of the invention showing the braking element.

FIG. 8 illustrates the braking element of a preferred embodiment of the invention. A brake shoe 80 pivots about brake pivot 81. Translation of cable 82 causes the rotation of brake shoe 80 such that it contacts and applies force to rear wheel 11. Return spring 83 restores the brake shoe to its neutral position when tension in cable 82 is released. Rails 30 and 31 comprise parallel surfaces that sandwich brake shoe 80 and locate brake pivot 81.

The foregoing discussion should be understood as illustrative and should not be considered to be limiting in any sense. While this invention has been particularly shown and described with reference to preferred embodiments thereof, it will be understood by those skilled in the art that various changes in form and details may be made therein without departing from the spirit and scope of the invention as defined by the claims.

The corresponding structures, materials, acts and equivalents of all means or step plus function elements in the claims below are intended to include any structure, material, or acts for performing the functions in combination with other claimed elements as specifically claimed.

What is claimed is:

1. A scooter comprising:
   a. a steerer;
   b. a platform having a top surface with an opening therethrough;
   c. a steerer support, that is:
      i. pivotally connected to said steerer about a first, steering axis; and
      ii. pivotally connected to said platform about a second axis that is substantially perpendicular to said first, steering axis, such that said steerer support is rotatable toward said platform from an unfolded position to a folded position in which said steerer support nests into an opening in said platform such that a portion of said steerer support extends, in the direction of folding, beyond the top surface of said platform; and
   d. a lock, arranged to releasably retain said steerer support in said unfolded position.

2. The scooter of claim 1, said platform having a motion axis aligned from a fore direction to an aft direction, said steerer having a centerline, said scooter further comprising a front wheel located fore of said platform, having a wheel axis of rotation, said steering axis and said front wheel axis of rotation both being located aft of the centerline of said steerer when said steerer is in a straight-ahead position.

3. The scooter of claim 2, further comprising:
   a. a rear wheel, coupled to said platform aft of said front wheel; and
   b. a fork connecting said steerer to said front wheel, defining:
      i. a steering angle between the steering axis and the motion axis; and
      ii. a fork offset between said steering axis and said wheel axis; and
      ii. a trail, defined when said front and rear wheels are both contacting a planar surface at contact points, as a distance between: said contact point of said front wheel upon said planar surface; and the intersection of said steering axis with said planar surface;
   said steering angle, the diameter of said front wheel, and the fork offset all being selected to provide a trail of between 0 and 75 mm.

4. A scooter comprising;
   a. a steerer having a centerline;
   b. a platform having a motion axis aligned from a fore direction to an aft direction;
   c. a steerer support, that is pivotally connected to said steerer about a first, steering axis located aft of the centerline of said steerer when said steerer is aligned along said motion axis in a straight ahead configuration;
   d. a front wheel located fore of said platform, having a wheel axis of rotation located aft of the centerline of said steerer when said steerer is aligned along said motion axis in a straight ahead configuration;
   e. a rear wheel, coupled to said platform aft of said front wheel; and
   f. a fork connecting said steerer to said front wheel, defining:
      i. a steering angle between the steering axis and the motion axis; and
      ii. a fork offset between said steering axis and said wheel axis; and
      ii. a trail, defined when said front and rear wheels are both contacting a planar surface at contact points, as a distance between: said contact point of said front wheel upon said planar surface; and the intersection of said steering axis with said planar surface;
   said steering angle, the diameter of said front wheel, and the fork offset all being selected to provide a trail of between 0 and 75 mm.

5. The scooter of claim 4, said front wheel further being located such that when said front and rear wheels are both contacting a planar surface at respective contact points, said front wheel contact point is aft of said steering axis.

6. A scooter comprising:
   a. a steerer having a centerline;
   b. a platform having a motion axis aligned from a fore direction to an aft direction;
   c. a steerer support, that is pivotally connected to said steerer about a first, steering axis;
   d. a front wheel located fore of said platform, having a wheel axis of rotation;
   e. a rear wheel, coupled to said platform aft of said front wheel; and
   f. a fork connecting said steerer to said front wheel, defining:
      i. a steering angle between the steering axis and the motion axis; and
      ii. a fork offset between said steering axis and said wheel axis; and
      ii. a trail, defined when said front and rear wheels are both contacting a planar surface at contact points, as a distance between: said contact point of said front wheel upon said planar surface; and the intersection of said steering axis with said planar surface; said steering angle, the diameter of said front wheel, and the fork offset all being selected to provide a trail of between 0 and 75 mm.

7. The scooter of claim 6, further wherein:
   a. said steerer support is arranged such that said steering axis is located aft of the centerline of said steerer when said steerer is aligned along said motion axis in a straight ahead configuration; and
   d. said front wheel is arranged such that said wheel axis is located aft of the centerline of said steerer when said steerer is aligned along said motion axis in a straight ahead configuration.

8. The scooter of claim 6, said steerer support further being pivotally connected to said platform about a second axis that is substantially perpendicular to said first, steering axis, such that said steerer support is rotatable toward said platform from an unfolded position to a folded position in which said steerer support nests into an opening in said platform such that a portion of said steerer support extends, in the direction of folding, beyond the top surface of said platform.

* * * * *